Patented Mar. 13, 1945

2,371,212

UNITED STATES PATENT OFFICE 2,371,212

SHELLAC MODIFIED WITH PRIMARY ALIPHATIC POLYAMINES

Henry Hall Bassford, Jr., Brooklyn, and William Howlett Gardner, Bayside, N. Y.

No Drawing. Application May 28, 1942, Serial No. 444,922

5 Claims. (Cl. 260—102)

This invention relates to new compositions of matter and specifically to products obtained by heating shellac with aliphatic polyamines and to the use of these products in preparing aqueous paints and varnishes.

This application is a continuation in part of our copending case Serial No. 332,456, filed April 30, 1940.

No mention has been made in the literature of the products obtained by heating shellac with aliphatic polyamines. Plastic molding compositions prepared by heating shellac and polyamine compounds such as dicyandiamide and o-tolyl biguanide have been described by Gardner (U. S. Patents 2,010,224 and 2,010,226). The use of various primary and secondary aromatic amines as hardening and thermosetting agents has also been described (U. S. Patents 1,673,805 and 1,673,806 and British Plastic and Moulded Trader 6, 514 (1935)). In all cases, the amount of amino derivative which has been recommended was only a small percentage (from 2 to 4%) of the shellac excepting in the case of sulfanilic acid where 8.32% was used.

We have found that if amounts of polyamine less than 10% of the weight of the shellac are heated with the latter, the polyamine acts as a polymerization agent, apparently catalyzing the reaction of shellac with itself to form rubbery, infusible and insoluble gels. With certain polyamino compounds of the type described in the Gardner patents insoluble, infusible compounds result as long as the amount of polyamine is less than 25% of the weight of the shellac.

However, we have found that, in the case of aliphatic polyamines, fusible soluble products can be obtained, providing the amount of polyamine is at least 10% of the weight of the shellac used.

Shellac and several other natural resins enjoy a variety of uses particularly in their alkaline aqueous solutions as hat binders, leather and shoe dressings, varnish for paper, floor waxes, inks, adhesives and the like.

The films obtained from these alkaline aqueous shellac solutions, however, have the disadvantage of being very brittle. There are but few plasticizers known today that are water-soluble and capable of addition to the aqueous shellac solution for the purpose of modifying the brittleness of the films. Even the water-soluble plasticizers, such as glycerine, for instance, but temporarily improve the flexibility of the films and to a limited extent only.

Shellac and its salts are insoluble in acid solution of pH less than 5. But acid solutions of modified shellac resins offer special promise for blending with other resins which require an acid setting agent, as well as in those cases where alkalies adversely affect the surface coated or cause fading or running of dyestuffs or pigments.

Shellac is used for impregnating paper, wool and felt. In the manufacture of hats, for example, the hat is made acid and then impregnated with a neutral solution of an alkaline shellac soap. The acid in the hat neutralizes the alkali and precipitates free shellac in the wool or felt fibers. For certain cases it would be desirable to pretreat a porous paper, wool or felt with alkali and then impregnate with an acid solution of a resin which is precipitated by the alkali in the felt.

An object, therefore, of our invention is the preparation of fusible, soluble reaction products of shellac with aliphatic polyamines. A second object is the preparation of modified shellac resins which are soluble in aqueous acid solution and are precipitated therefrom by alkalies. A third object is the preparation of aqueous solutions containing shellac-aliphatic polyamine reaction products, which on evaporation, yield permanently flexible films.

The first and second objects can be accomplished by heating shellac at a temperature of 110° C. or above, in the presence of a condensation catalyst such as p-toluene sulfonic acid, with at least 10% its weight of an aliphatic polyamine such as ethylene diamine, propylene diamine, diamino pentane, diamino hexane and the like. The shellac used may be any form of lac, the secretion of the insect *Tachardia lacca* Kerr, whether in raw, refined or manufactured form. The third object can be achieved by dissolving the aliphatic polyamine shellac product in water to which has been added a strong mineral acid such as hydrochloric, sulfuric or phosphoric, or an organic acid such as acetic, propionic and the like.

In the preparation of the shellac-aliphatic-polyamine resin the reaction between the components is usually evidenced by the appearance of foam due to water and some ammonia evolved during the reaction. The reaction is preferably continued until the foaming has stopped which, at the temperature usually employed, takes less than one hour. Prolonged heating of the molten shellac product is sometimes desirable in order to prepare a product essentially free of unreacted amine.

The following example in which parts are given by weight is illustrative of this invention.

Example 50 parts by weight of shellac are dissolved in 19 parts by weight of ethylene diamine at approximately 100° C. After dissolution of the shellac, 0.5 part by weight of para-toluene sulphonic acid (catalyst) are added and the mixture is agitated for about 40 minutes at a temperature of approximately 130–140° C.

The precipitation and purification of the reaction product is accomplished in the following manner. The reaction mixture obtained is miscible with an equal volume of water. When this solution is poured into a large volume of water the resin product precipitates as a gummy material and can be recovered by decantation. The film yielded by an aqueous hydrochloric acid solution of this product is considerably more flexible and ductile than a comparative film obtained from an ammoniacal solution of an untreated shellac.

The same product may be obtained by a reaction temperature within the range of 100–200° C. and even higher in the absence of the catalyst. At the lower temperature a longer time than that specified in the example is necessary for the reaction.

The products obtained in accordance with this invention are soluble in aqueous acid solutions, for example, in dilute aqueous hydrochloric acid, and are precipitated therefrom by aqueous ammonium hydroxide. These products are also soluble in ethyl and methyl alcohol and anhydrous acetic acid, but are insoluble in ether and hydrocarbon solvents. They are also somewhat soluble in aqueous solutions of NaOH but are precipitated therefrom upon dilution with water.

As many apparently widely different embodiments of this invention may be made without departing from the spirit and scope thereof, it is to be understood that we do not limit ourselves to the specific embodiments thereof except as defined in the appended claims.

Having described our invention, what we claim and desire to secure by Letters Patent, is as follows:

1. A modified shellac product obtained by heating shellac with at least 10 per cent of its weight of a primary aliphatic polyamine at a temperature of about 110° C. to about 200° C. in the presence of a condensation catalyst.

2. A method of making a modified shellac capable of yielding substantially flexible films from its solutions in non-alkaline aqueous media which comprises reacting shellac with at least 10 per cent of its weight of a primary aliphatic polyamine at a temperature of about 110° C. to about 200° C. in the presence of a condensation catalyst.

3. Method in accordance with claim 2 in which said primary aliphatic polyamine is ethylene diamine.

4. A film forming solution of a shellac product resulting from the reaction of shellac with at least 10 per cent of its weight of a primary aliphatic polyamine at a temperature of about 110° C. to about 200° C. in the presence of a condensation catalyst.

5. A substantially flexible film resulting from the evaporation of the moist film deposited from the solution defined in claim 4.

HENRY HALL BASSFORD, Jr.
WILLIAM HOWLETT GARDNER.